Feb. 2, 1965  W. E. RANEY ETAL  3,167,869

OPTICAL MEASURING DEVICE

Filed April 24, 1962

*INVENTORS*
WILLIAM E. RANEY
ARTHUR T. WEST
HOWARD C. LIEBING
BY Oberlin, Maky & Donnelly
ATTORNEYS

United States Patent Office 3,167,869
Patented Feb. 2, 1965

3,167,869
OPTICAL MEASURING DEVICE
William E. Raney, 20080 Frazier Drive, Rocky River, Ohio, and Arthur T. West, Fairview Park, and Howard C. Liebing, Middleburg Heights, Ohio; said West and said Liebing assignors to William E. Raney, Lakewood, Ohio
Filed Apr. 24, 1962, Ser. No. 189,776
7 Claims. (Cl. 33—201)

This invention relates generally, as indicated, to an optical measuring device and more particularly to an optical measuring instrument for determining the proper point position, point angles and relief angles on a cutting tool such as a twist drill.

In tools, such as twist drills, various special point angles are recommended for various materials and such may vary anywhere from 60° to 140°. Material, such as steel, requires a rather flat point angle of say 140° whereas softer materials, such as Bakelite, hard rubber and fiber, require a point angle of from 60° to 90°. When sharpening drills for a particular material, it is sometimes difficult to determine when the proper point angle has been obtained and in the selection of drills, it is difficult usually to determine the point angle without the assistance of a special optical measuring device. In the manufacture of twist drills and in the grinding thereof, it is difficult properly to position the chisel edge point in the center of the drill and if the point is improperly positioned, the drill is subjected to unnecessary wear and the hole is not of the desired size. The failure to provide a proper angle of lip clearance at the center of the drill and the proper lip relief angle can result in serious tool damage, as well as provide an inefficient tool. It has heretofore been impossible properly to determine the point position, point angle and relief angle on a single measuring instrument without making laborious changes in the setting of the tool or the position of the optical measuring device.

It is accordingly a principal object of the present invention to provide an optical measuring instrument which will quickly and easily determine the point position, relief angles and point angles of a twist drill.

It is another main object to provide an optical measuring device for determining such position and angles of a twist drill or the like which will be of sturdy and simplified design.

It is another object to provide such measuring device which can readily and easily be manipulated to provide the desired information.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figure 2:
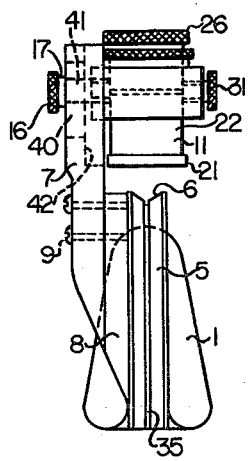
FIG. 2 is an end elevation of the measuring instrument of FIG. 1 taken substantially from the line 2—2 thereof.
Figure 1:
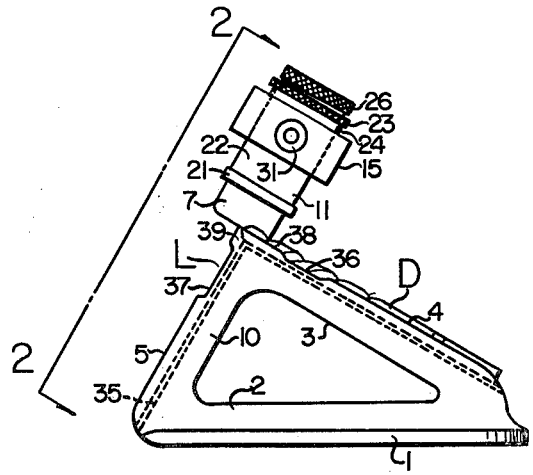
FIG. 1 is a side elevation of an optical measuring device in accordance with the present invention.

Referring now to the annexed drawing and more particularly to FIGS. 1 and 2, it will be seen that the illustrated embodiment of the present invention is comprised of a base plate 1 formed integrally with a right triangular stand 2 having an opening 3 therein of similar right triangular configuration. The top surfaces 4 and 5 of such stand are normal to each other as seen in FIG. 1 and are grooved or V-shape as shown at 6 in FIG. 2. Such grooves are preferably carefully finished so that they are precisely normal to each other and so that they will firmly support a drill shank substantially throughout its length.

A bracket 7 is mounted on a spacer 8 as by suitable fastening means such as the screws 9 and such bracket and spacer are firmly secured to the shorter leg 10 of the stand 2. The bracket 7 extending parallel to the leg 10 and thus the supporting surface 5 projects from the apex of the stand and holds optics assembly 11. Such assembly includes a magnifying and measuring comparator which will hereinafter be described in detail, the optical light path L of which substantially coincides with the axis of the shank of a drill positioned in the V-grooved supporting surface 5 of the stand 2.

The optics assembly 11 is held in place by a holding ring 15 which is in turn held to the bracket 7 by a bracket attaching screw 16. The knurled bracket attaching screw 16 may pass through a washer or spacer 17 and it can readily be seen that the optics assembly 11 can easily be detached from the bracket 7 if desired.

Figure 3:
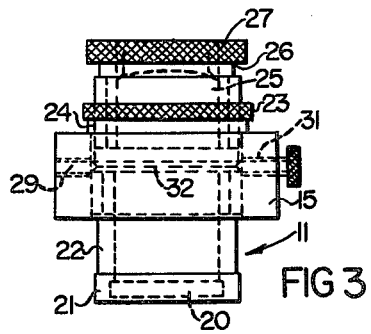
FIG. 3 is an enlarged detail view of the optic assembly of the present invention.

Referring now more particularly to FIG. 3, it will be seen that the optics assembly is compared of a reticle 20, a reticle nut 21 on the lower end of a clear plastic reticle spacer tube 22. The transparent reticle spacer tube 22 is part of the reticle holder 24 which extends through the optics holding ring 15 and is formed with a knurled upper edge shown at 23.

Figure 4:
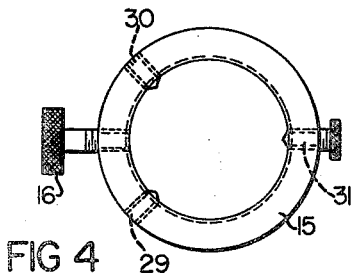
FIG. 4 is a plan view of the optics holder seen in elevation in FIG. 3.

A lens assembly including a lens 25, a lens nut 26 and a lens holder 27 is telescopically mounted within the knurled upper edge 23 of the reticle holder. As seen in FIG. 4, reticle centrallizing screws 29 and 30 may be employed together with a knurled reticle holding thumb screw 31 properly to center and position the reticle holder and thus the reticle 20. Screws 29 and 30 may be manipulated by a small screw driver or the like and the screws 29 through 31 may engage in an annular groove 32 in the holder 24. The focal length of the assembly may, of course, be adjusted by the lens nut 26 to accommodate the vision of the user. The clear plastic spacer 22 permits light to enter the assembly so that the lines on the reticle 20 as hereinafter described may easily be viewed together with the edges of the cutting tool to be measured.

It is noted that the V-grooved top surfaces 4 and 5 of the stand 2 are provided with small bottom grooves as shown at 35 and such drill shank supporting surfaces are relieved as shown at 36 and 37 near the apex of the stand and in this manner extremely small diameter drill shanks can be rotated by the user between the thumb or forefinger, for example, adjacent the end thereof so that they can be rotated and positioned properly to view the points and angles thereof through the optics assembly. The relieved portions 36 and 37 are, however, spaced from the apex of the stand to leave supporting surfaces for the drill shanks at the apex as shown at 38 and 39 so that the tip of the drill will properly be supported. The optics assembly 11 is generally conventional and such incorporates the adjustment of the lens position to correct the focus for the user and the entire unit 11 can be moved toward and away from the work. This is accomplished by a slot 40 through which the shank 41 of the bracket attaching screw 16 fits so that the position of the optical device including the holding ring 15 can readily be adjusted by adjusting the position of the screw within the slot 40. It is noted that the upwardly extending bracket 7 is provided with a recess 42 which is preferably arcuate and which seats the holding ring 15 firmly to be held and gripped by the bracket attaching screw 16.

Figure 5:
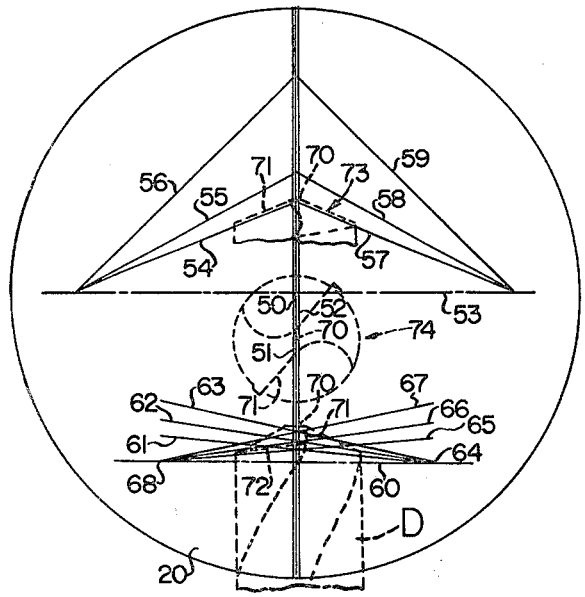
FIG. 5 is a plan view of the reticle that may be employed with the present invention.

FIG. 5 is an enlarged plan view of the reticle of the present invention by which the point angles, point position, and relief angles of a twist drill can readily be determined. In the illustrated embodiment, the actual diameter of the reticle may be only slightly over 1 inch and such may be a clear plastic disc provided with three parallel lines 50, 51 and 52, with the centerline 51 extending diametrically through the exact center of the disc. The lines 50 and 51 may be spaced, for example, .0032 inch, and the lines 51 and 52 may be spaced, for example, .0016 inch. Extending upwardly from a diameter shown by the phantom line 53 there is provided on each side of the lines 50 through 52 sets of point angle measuring lines 54, 55, 56 and 57, 58 and 59. These sets of lines are symmetrical about the centerline 51. The lines 54 and 57 may form at their intersection an angle of 135°, the lines 55 and 58 may form an angle of 118°, and the lines 56 and 59 may be normal to each other. These lines will be employed to measure the most common point angles of drills which may be positioned on the top surface 4 of the stand 2 and rotated until the point profile is visible for comparison with the desired one of the three point angles 135°, 118°, or 90°.

Positioned beneath the point measuring angles, there are provided two sets of lines, both of which originate on chord 60 of the reticle disc 20. The chord 60 is parallel to the diameter 53 and therefore normal to the point position determining lines 50, 51 and 52. One set of lines 61, 62 and 63, originating at the point 64, may be exactly symmetrical about the line 51 with the lines 65, 66 and 67 originating at the point 68. The line 61 may, for example, be at 5° to the chord 60 and the line 62 may be at 8° and the line 63 may be at 12°, and these may readily be superimposed over the lip relief angles of a drill when positioned on the supporting surface 4 of the stand 2. It will, of course, be understood that the symmetrical sets of lines 61, 62 and 63 and 65, 66 and 67 may be employed to measure the lip relief angles on opposite hand drills.

In operation, a drill D may be placed upon the grooved surface 4 and the operator may adjust the focus of the lens 25 so that the tip of the drill may be viewed through the lens and reticle within the optic assembly. As is well-known, twist drills are pointed with a chisel edge of short length as shown at 70 in FIG. 5. By rotating the drill D, as with the thumb and forefinger through the opening provided by the relieved portion 36 in the grooved surface, it is possible to position the lip 71 of the drill substantially parallel to the diameter 51 and in this manner, the lip relief angle, in the case of a right-hand drill D, may be compared with the lines 65, 66 or 67. As is known in the art, the lip relief angle is the angle measured between a tangent on a surface back of the cutting edge for lip 71 at the periphery, and a plane at right angles to the axis of the drill or the chord line 60.

The most common lip relief angles are from 8° to 12° and it can readily be seen that the desired lip relief angle of anywhere from 5° to 12° can readily be determined. The lip relief angle on the opposite side of the drill can also be determined simply by rotating the drill 180° to position the opposite lip parallel to the diameter 51 to measure the relief angle on that side.

The drill D may then be shoved upwardly along the support surface 4 a very short distance and rotated approximately 90° to position the lip 71 in the same plane as the reticle and in this position the drill D will appear as shown generally at 73. Here the lip 71 is parallel to the plane of the reticle and accordingly the point angle can readily be determined. In the illustrated example, the point angle approximates the lines 54 and 57 so that the point angle may then be measured at approximately 135°. It can readily be seen with the illustrated reticle that point angles of 135°, 118° and 90° can readily be determined. The lip relief and point angles can then be determined simply by rotating the workpiece D on the grooved support 4 and sliding it therealong to align the point and relief angles with the various sets of lines provided on the reticle 20.

Whereas the illustrated reticle illustrates sets of lines for measuring the point angles at 135°, 118° and 90°, it will readily be understood that other sets of lines may be provided although the lines indicated will approximate the entire desired range for various materials. For example, steel may take a point angle of 140° whereas Bakelite, hard rubber or fiber will take a point angle of from 60° to 90°. Brass and bronze are preferably at 118° and soft cast iron may be at 90°, copper at approximately 100° with slate at 90° and steel forgings of a 250 Brinell plus hardness will be from 125° to 140°.

To determine the correct positioning of the point 70, the drill D need only be removed from the surface 4 and placed upon the surface 5 with the point directed toward the reticle. If desired, the reticle may be employed as a stop for the tip of the drill, but in any event, the drill may appear as shown by the dotted line position of the drill D at 74. On the surface 5, the drill will be firmly supported and centered by the sides of the groove and the centerline 51 will bisect the angle between such side supporting surfaces. In this manner, the drill D will be centered and it can readily be rotated until the point or chisel edge 70 is aligned with the set of lines 50, 51 and 52. If the drill point is off center, it can readily be determined whether it is more than .0016 or .0032 off center simply by rotating the eccentric chisel edge until it lies outside either of the two outside lines. For certain size drills, the .0016 line may be the maximum eccentricity permitted and for certain larger size drills the .0032 may be the maximum tolerance. It will, of course, be understood that the position of the drill with respect to the center of the reticle may change depending upon the diameter of the drill being measured and for this reason, the lines 50, 51 and 52 extend the entire diameter of the reticle. Thus a larger drill would show up higher on the reticle than the drill illustrated in dotted lines, but due to the fact that the center diameter 51 bisects the side supporing surfaces of the groove, the center of the drill will always be in position to be measured by the lines 50, 51 and 52.

It can now be seen that there is provided a simplified optical measuring device by which the point angle, lip relief angle, and center point position can be inspected on cutting tools such as twist drills without making any adjustments in the device itself. Thus the workpiece is measured by placing it in line with the light path and normal to such light path. This is accomplished by the right triangular base, the opening 3 in which permits the device easily to be handled.

The optic assembly shown in FIG. 3 can readily be disassembled so that the reticle may be replaced by another having a different set of lines thereon. In this manner, cutting tools of varying point angles, etc. can readily be inspected.

The only adjustments required will be the initial centering of the reticle by means of the centering screws 29, 30 and 31, the screws 29 and 30 being manipulated by a screw driver or the like. After that, the focus of the eyepiece may be adjusted and further adjustments need not be made as long as the same reticle is employed.

Other modes of applying the principle of the invention may be employed, change being made as regards the details described, provided the features stated in any of the following claims or the equivalent of such be employed.

We, therefore, particularly point out and distinctly claim as our invention:

1. An optical measuring device comprising a base having a triangular stand thereon, said triangular stand including workpiece supporting surfaces extending substantially normal to each other, an optic assembly fixedly mounted at the apex of said stand, the light path of said assembly extending substantially parallel to one of said supporting surfaces and substantially normal to the other, and means in said optic assembly to measure a workpiece supported on said supporting surfaces.

2. A device as set forth in claim 1 wherein said optic assembly includes a reticle and a lens, and means to center said reticle with respect to at least one of said supporting surfaces.

3. A device as set forth in claim 1 wherein said supporting surfaces are V-shape grooves, said reticle including a diametrically extending line in a plane bisecting said V-shape grooves.

4. A device as set forth in claim 3 including tolerance lines on either side of said diametrically extending line.

5. A device as set forth in claim 4 including a series of common origin angularly extending lines symmetrical about said diametrically extending lines adapted to measure the lip relief angle of a drill or the like supported on said supporting surfaces.

6. A twist drill gauge comprising a fixed optics assembly adapted to measure such twist drill or the like, support means for said optics assembly including work supporting surfaces respectively extending parallel and normal to the light path of said optics assembly and thus substantially normal to each other whereby such twist drill may be viewed axially or transversely, said support means comprising a right triangular base for said optics assembly, the legs of said triangular base being the respective work supporting surfaces.

7. A twist drill gauge as set forth in claim 6 wherein said optics assembly includes a reticle therein having lines thereon to measure the point position, point angle and relief angle of such twist drill.

References Cited by the Examiner
UNITED STATES PATENTS

| | | | |
|---|---|---|---|
| 1,489,372 | 4/24 | Steinle | 33—201 |
| 1,937,433 | 11/33 | Moe | 33—17 |

FOREIGN PATENTS

| | | |
|---|---|---|
| 745,950 | 12/44 | Germany. |
| 410,050 | 5/34 | Great Britain. |

ISAAC LISANN, *Primary Examiner.*